US012624975B2

(12) United States Patent
Kain

(10) Patent No.: US 12,624,975 B2
(45) Date of Patent: May 12, 2026

(54) SENSOR NERVOUS SYSTEM

(71) Applicant: Aron Kain, Suffern, NY (US)

(72) Inventor: Aron Kain, Suffern, NY (US)

( * ) Notice: Subject to any disclaimer, the term of this patent is extended or adjusted under 35 U.S.C. 154(b) by 357 days.

(21) Appl. No.: 18/085,235

(22) Filed: Dec. 20, 2022

(65) Prior Publication Data

US 2023/0194317 A1 Jun. 22, 2023

Related U.S. Application Data

(60) Provisional application No. 63/292,461, filed on Dec. 22, 2021.

(51) Int. Cl.
G01D 21/02 (2006.01)
G01D 18/00 (2006.01)
H04W 4/38 (2018.01)

(52) U.S. Cl.
CPC ............. G01D 21/02 (2013.01); G01D 18/00 (2013.01); H04W 4/38 (2018.02)

(58) Field of Classification Search
CPC ........... B60R 25/1004; B60W 50/0205; G01D 21/02; G01D 18/00; G01D 18/002; G01D 18/006; G01S 5/0289; G05B 19/0421; G07C 9/00; G08B 25/10; G08C 15/00; G08C 2200/00; H04J 3/0641; H04L 67/12; H04L 69/18; H04L 41/0836; H04L 67/1051; H04L 67/125; H04L 12/66; H04L 69/329; H04Q 9/02; H04Q 9/00; H04W 84/18; H04W 24/02; H04W 24/04; H04W 24/10; H04W 40/24; H04W 4/38; H04W 56/001; H04W 4/70; H04W 40/14; H04W 48/17; H04W 64/00; H04W 88/16; Y04S 40/18
See application file for complete search history.

(56) References Cited

U.S. PATENT DOCUMENTS 4,177,357 A 12/1979 Mayer
4,288,291 A 9/1981 Cisco et al.
(Continued)

FOREIGN PATENT DOCUMENTS

KR 10-2017-0044483 A 4/2017
WO WO-2020051195 A1 * 3/2020 ........... G01D 11/245

OTHER PUBLICATIONS

International Search Report and Written Opinion of the International Searching Authority dated May 10, 2023, from the corresponding International Application No. PCT/US2022/053545.
(Continued)

*Primary Examiner* — Catherine T. Rastovski
*Assistant Examiner* — Eric Sebastian Von Wald
(74) *Attorney, Agent, or Firm* — KATTEN MUCHIN ROSENMAN LLP

(57) ABSTRACT

The sensor nervous system (SNS) comprises an ecosystem where sensors can be deployed such that any sensor from any vendor can be integrated into or removed from the SNS without the need for redesigning the sensor, sensor system, or SNS to accommodate the changes in sensor device count, type, or functionality. The SNS is agnostic to which platform it is deployed upon and can be used for retrofitting and enhancing existing platforms or integrated into new platform designs. Individual sensors are integrated into sensor pods and the sensor pods are, in turn, integrated into the SNS ecosystem.

18 Claims, 3 Drawing Sheets

(56) References Cited

U.S. PATENT DOCUMENTS

| | | | |
|---|---|---|---|
| 4,343,020 A | 8/1982 | Stapleton | |
| 4,361,833 A | 11/1982 | Allgood | |
| 4,418,359 A | 11/1983 | Stapleton | |
| 4,423,936 A | 1/1984 | Johnson | |
| 4,670,974 A | 6/1987 | Antoszewski et al. | |
| 4,860,216 A | 8/1989 | Linsenmayer | |
| 4,908,951 A | 3/1990 | Gurny | |
| 5,019,777 A | 5/1991 | Gulliver et al. | |
| 5,040,157 A | 8/1991 | Roderick et al. | |
| 5,054,882 A | 10/1991 | Riccitelli et al. | |
| RE33,774 E | 12/1991 | Gurny | |
| 5,107,249 A | 4/1992 | Johnson | |
| 5,166,990 A | 11/1992 | Riccitelli et al. | |
| 5,189,590 A | 2/1993 | Schneider | |
| 5,247,490 A | 9/1993 | Goepel et al. | |
| 5,302,941 A | 4/1994 | Berube | |
| 5,307,272 A | 4/1994 | Butler et al. | |
| 5,307,289 A | 4/1994 | Harris | |
| 5,312,590 A | 5/1994 | Gunasingham | |
| 5,333,129 A | 7/1994 | Buckingham | |
| 5,376,106 A | 12/1994 | Stahmann et al. | |
| 5,451,960 A | 9/1995 | Kastella et al. | |
| 5,483,160 A | 1/1996 | Gulliver et al. | |
| 5,541,653 A | 7/1996 | Peters et al. | |
| 5,553,500 A | 9/1996 | Grahn et al. | |
| 5,604,314 A | 2/1997 | Grahn | |
| 5,645,513 A | 7/1997 | Haydocy et al. | |
| 5,680,048 A | 10/1997 | Wollny | |
| 5,686,669 A | 11/1997 | Hernandez et al. | |
| 5,700,360 A | 12/1997 | Chan et al. | |
| 5,709,839 A | 1/1998 | Dobson | |
| 5,793,174 A | 8/1998 | Kovach et al. | |
| 5,804,715 A | 9/1998 | Bennett | |
| 5,872,536 A | 2/1999 | Lyons et al. | |
| 5,881,163 A | 3/1999 | Slump et al. | |
| 5,901,242 A | 5/1999 | Crane et al. | |
| 5,968,329 A | 10/1999 | Anderson et al. | |
| 5,990,646 A | 11/1999 | Kovach et al. | |
| 6,057,658 A | 5/2000 | Kovach et al. | |
| 6,088,810 A | 7/2000 | Ribes et al. | |
| 6,128,019 A | 10/2000 | Crocker, III et al. | |
| 6,132,593 A | 10/2000 | Tan | |
| 6,181,089 B1 | 1/2001 | Kovach et al. | |
| RE37,065 E | 2/2001 | Grahn | |
| 6,204,768 B1 | 3/2001 | Kosugi et al. | |
| 6,247,347 B1 | 6/2001 | DiMora | |
| 6,259,218 B1 | 7/2001 | Kovach et al. | |
| 6,324,899 B1 | 12/2001 | Discenzo | |
| 6,338,010 B1 | 1/2002 | Sparks et al. | |
| 6,359,586 B1 | 3/2002 | Sviestins | |
| 6,369,530 B2 | 4/2002 | Kovach et al. | |
| 6,381,340 B1 | 4/2002 | Storey | |
| 6,384,605 B1 | 5/2002 | Li | |
| 6,397,130 B1 | 5/2002 | Carr et al. | |
| 6,415,188 B1 | 7/2002 | Fernandez et al. | |
| 6,430,986 B2 | 8/2002 | DiMora | |
| 6,442,993 B2 | 9/2002 | DiMora | |
| 6,445,292 B1 | 9/2002 | Jen et al. | |
| 6,445,983 B1 | 9/2002 | Dickson et al. | |
| 6,525,329 B1 | 2/2003 | Berman | |
| 6,526,395 B1 | 2/2003 | Morris | |
| 6,560,279 B1 | 5/2003 | Renz | |
| 6,577,976 B1 | 6/2003 | Hoff et al. | |
| 6,649,416 B1 | 11/2003 | Kauer et al. | |
| 6,663,756 B2 | 12/2003 | Lee et al. | |
| 6,718,041 B2 | 4/2004 | Debail | |
| 6,757,641 B1 | 6/2004 | Immer et al. | |
| 6,767,758 B1 | 7/2004 | Geen | |
| 6,771,208 B2 | 8/2004 | Lutter et al. | |
| 6,792,309 B1 | 9/2004 | Noren | |
| 6,834,560 B1 | 12/2004 | Brundage | |
| 6,837,107 B2 | 1/2005 | Geen | |
| 6,845,665 B2 | 1/2005 | Geen | |
| 6,848,304 B2 | 2/2005 | Geen | |
| 6,853,315 B2 | 2/2005 | Schiller et al. | |
| 6,909,997 B2 | 6/2005 | Chen et al. | |
| 6,922,664 B1 | 7/2005 | Fernandez et al. | |
| 6,944,566 B2 | 9/2005 | Chen et al. | |
| 6,967,612 B1 | 11/2005 | Gorman et al. | |
| 6,974,006 B2 | 12/2005 | Ruckman et al. | |
| 6,975,944 B1 | 12/2005 | Zenhausern | |
| 6,993,988 B2 | 2/2006 | Brundage | |
| 7,002,470 B1 * | 2/2006 | Miao | H04B 1/71635 |
| | | | 340/539.22 |
| 7,010,970 B2 | 3/2006 | Rediniotis et al. | |
| 7,038,780 B2 | 5/2006 | Chovan et al. | |
| 7,065,465 B2 | 6/2006 | Chen | |
| 7,079,023 B2 | 7/2006 | Haller | |
| 7,096,159 B2 | 8/2006 | Cataltepe et al. | |
| 7,102,503 B2 | 9/2006 | Tsuyoshi et al. | |
| 7,146,286 B2 | 12/2006 | Takeda et al. | |
| 7,192,403 B2 | 3/2007 | Russell | |
| 7,283,904 B2 | 10/2007 | Benjamin et al. | |
| 7,292,833 B2 | 11/2007 | Marro et al. | |
| 7,295,125 B2 | 11/2007 | Gabriel | |
| 7,296,485 B2 | 11/2007 | Kain | |
| 7,343,051 B1 | 3/2008 | Hsu | |
| 7,351,982 B2 | 4/2008 | Hofstetter et al. | |
| 7,367,222 B2 | 5/2008 | Kahn et al. | |
| 7,443,310 B2 | 10/2008 | Boran et al. | |
| 7,446,694 B1 | 11/2008 | Ahmed et al. | |
| 7,480,577 B1 | 1/2009 | Feller | |
| 7,576,681 B2 | 8/2009 | Chen et al. | |
| 7,642,898 B1 | 1/2010 | Malocha et al. | |
| 7,664,300 B2 | 2/2010 | Lange et al. | |
| 7,680,192 B2 | 3/2010 | Kaplinsky | |
| 7,697,839 B2 | 4/2010 | Cutler | |
| 7,701,874 B2 | 4/2010 | Kline et al. | |
| 7,733,595 B2 | 6/2010 | Lucas et al. | |
| 7,772,533 B2 | 8/2010 | Brock et al. | |
| 7,777,625 B1 | 8/2010 | Puccio et al. | |
| 7,800,527 B2 | 9/2010 | Douglass et al. | |
| 7,869,566 B2 | 1/2011 | Edic et al. | |
| 7,899,272 B1 | 3/2011 | Hsu | |
| 7,903,871 B2 | 3/2011 | Kaplinsky et al. | |
| 7,921,695 B2 | 4/2011 | Larocque | |
| 7,957,902 B2 | 6/2011 | Karabin et al. | |
| 7,961,105 B2 | 6/2011 | Puccio et al. | |
| 8,004,488 B2 | 8/2011 | Park | |
| 8,009,200 B2 | 8/2011 | Goh et al. | |
| 8,085,882 B1 | 12/2011 | Su | |
| 8,119,980 B2 | 2/2012 | Malmin et al. | |
| 8,186,201 B2 | 5/2012 | Petrovic | |
| 8,224,282 B2 | 7/2012 | Songkakul et al. | |
| 8,233,353 B2 | 7/2012 | Zhang et al. | |
| 8,239,046 B2 * | 8/2012 | Koehler | G01D 3/08 |
| | | | 700/20 |
| 8,249,811 B2 | 8/2012 | Petrovic | |
| 8,265,818 B2 | 9/2012 | Allport | |
| 8,288,713 B2 | 10/2012 | Goebel | |
| 8,290,741 B2 | 10/2012 | Otts | |
| 8,295,409 B1 | 10/2012 | Su | |
| 8,355,834 B2 | 1/2013 | Duggan et al. | |
| 8,364,312 B2 | 1/2013 | Tobey | |
| 8,395,907 B2 | 3/2013 | Marszalek et al. | |
| 8,417,482 B2 | 4/2013 | Bohan et al. | |
| 8,443,647 B1 | 5/2013 | Kolmakov et al. | |
| 8,512,241 B2 | 8/2013 | Bandy et al. | |
| 8,545,417 B2 | 10/2013 | Banet et al. | |
| 8,558,907 B2 | 10/2013 | Goh et al. | |
| 8,575,926 B2 | 11/2013 | Chao et al. | |
| 8,579,838 B2 | 11/2013 | Jang et al. | |
| 8,602,793 B1 | 12/2013 | Sniedzins | |
| 8,612,894 B2 | 12/2013 | Kim | |
| 8,615,284 B2 | 12/2013 | Arneson et al. | |
| 8,622,922 B2 | 1/2014 | Banet et al. | |
| 8,649,930 B2 | 2/2014 | Reeve et al. | |
| 8,718,838 B2 | 5/2014 | Kokkeby et al. | |
| 8,740,807 B2 | 6/2014 | Banet et al. | |
| 8,755,469 B1 | 6/2014 | Su | |
| 8,767,071 B1 | 7/2014 | Marshall | |
| 8,797,206 B2 | 8/2014 | Uysal et al. | |
| 8,856,692 B2 | 10/2014 | Kim | |
| 8,859,268 B2 | 10/2014 | Mukundan et al. | |

(56) References Cited

U.S. PATENT DOCUMENTS

| | | | |
|---|---|---|---|
| 8,869,095 B2 | 10/2014 | Long et al. | |
| 8,885,548 B2 * | 11/2014 | Pandey | H04W 8/005 |
| | | | 370/324 |
| 8,930,161 B2 | 1/2015 | Baek et al. | |
| 8,934,884 B2 | 1/2015 | Hee | |
| 8,963,428 B2 | 2/2015 | Kang et al. | |
| 8,964,027 B2 | 2/2015 | Zhang et al. | |
| 8,994,513 B2 | 3/2015 | Watt | |
| 9,001,229 B2 | 4/2015 | Goh et al. | |
| 9,008,794 B2 | 4/2015 | Alexandre | |
| 9,030,408 B2 | 5/2015 | Latta et al. | |
| 9,057,777 B2 | 6/2015 | Guignard et al. | |
| 9,063,016 B2 | 6/2015 | Bohan et al. | |
| 9,099,125 B1 | 8/2015 | Hattori et al. | |
| 9,108,841 B1 | 8/2015 | Bowles et al. | |
| 9,124,778 B1 | 9/2015 | Crabtree | |
| 9,149,230 B2 | 10/2015 | Caron et al. | |
| 9,173,592 B2 | 11/2015 | Bandy et al. | |
| 9,176,089 B2 | 11/2015 | Le Neel et al. | |
| 9,222,867 B2 | 12/2015 | Norling et al. | |
| 9,237,635 B2 | 1/2016 | Kang et al. | |
| 9,246,543 B2 | 1/2016 | Zhou et al. | |
| 9,251,683 B2 | 2/2016 | Petrovic | |
| 9,255,923 B2 | 2/2016 | Mukundan et al. | |
| 9,256,217 B2 | 2/2016 | Washington et al. | |
| 9,277,204 B2 | 3/2016 | Gilliland et al. | |
| 9,285,501 B2 | 3/2016 | Christy | |
| 9,288,875 B2 | 3/2016 | Billig et al. | |
| 9,305,596 B2 | 4/2016 | Trantham et al. | |
| 9,327,965 B2 | 5/2016 | Gogoi | |
| 9,339,211 B2 | 5/2016 | Banet et al. | |
| 9,347,029 B2 | 5/2016 | Zou et al. | |
| 9,360,310 B2 | 6/2016 | Sala et al. | |
| 9,367,119 B2 | 6/2016 | Sala et al. | |
| 9,376,310 B2 | 6/2016 | Bowles et al. | |
| 9,391,986 B2 | 7/2016 | Schultz et al. | |
| 9,393,975 B2 | 7/2016 | Chen | |
| 9,395,339 B2 | 7/2016 | Sarr et al. | |
| 9,396,745 B2 | 7/2016 | Macken et al. | |
| 9,411,042 B2 | 8/2016 | Brady et al. | |
| 9,417,107 B2 | 8/2016 | Xiang | |
| 9,420,264 B2 | 8/2016 | Gilliland et al. | |
| 9,476,730 B2 | 10/2016 | Samarasekera | |
| 9,488,492 B2 | 11/2016 | Samarasekera et al. | |
| 9,500,739 B2 | 11/2016 | Woodruff | |
| 9,504,392 B2 | 11/2016 | Woodruff et al. | |
| 9,513,376 B1 | 12/2016 | Heinrich et al. | |
| 9,514,751 B2 | 12/2016 | Kim | |
| 9,536,549 B1 | 1/2017 | Ge et al. | |
| 9,552,834 B1 | 1/2017 | Sapozhnikov et al. | |
| 9,557,177 B2 | 1/2017 | Zhang et al. | |
| 9,580,302 B2 | 2/2017 | Zhang et al. | |
| 9,618,653 B2 | 4/2017 | Le Neel et al. | |
| 9,672,462 B2 | 6/2017 | Mlybari et al. | |
| 9,681,043 B2 | 6/2017 | Chen et al. | |
| 9,685,177 B2 | 6/2017 | Ge et al. | |
| 9,689,824 B2 | 6/2017 | Le Neel et al. | |
| 9,698,193 B1 | 7/2017 | Karim et al. | |
| 9,710,413 B2 | 7/2017 | Leo et al. | |
| 9,711,127 B2 | 7/2017 | Hui et al. | |
| 9,715,009 B1 | 7/2017 | Parker et al. | |
| 9,750,457 B2 | 9/2017 | Hallberg | |
| 9,758,368 B2 | 9/2017 | Gogoi | |
| 9,804,659 B2 | 10/2017 | Gu et al. | |
| 9,810,653 B2 | 11/2017 | Shankar et al. | |
| 9,817,203 B2 | 11/2017 | Lakshmikumar et al. | |
| 9,818,445 B2 | 11/2017 | Zhu et al. | |

| | | | |
|---|---|---|---|
| 9,833,171 B2 | 12/2017 | Yin et al. | |
| 9,862,594 B2 | 1/2018 | Gogoi | |
| 9,870,791 B1 | 1/2018 | Sapozhnikov et al. | |
| 9,890,038 B2 | 2/2018 | Gogoi | |
| 9,900,109 B2 | 2/2018 | Bandy et al. | |
| 9,901,741 B2 | 2/2018 | Chapman et al. | |
| 9,909,930 B2 | 3/2018 | Zivkovic et al. | |
| 9,910,128 B2 | 3/2018 | Griggs et al. | |
| 9,911,340 B2 | 3/2018 | Samarasekera et al. | |
| 9,921,331 B2 | 3/2018 | Miles | |
| 9,921,835 B2 | 3/2018 | Peixoto Machado Da Silva et al. | |
| 9,933,329 B2 | 4/2018 | Hansen et al. | |
| 9,983,173 B2 | 5/2018 | Aslanyan et al. | |
| 9,996,617 B2 | 6/2018 | Hassan et al. | |
| 9,999,924 B2 | 6/2018 | Dave et al. | |
| 10,007,349 B2 | 6/2018 | Latta et al. | |
| 10,013,634 B2 | 7/2018 | Sharma et al. | |
| 10,014,026 B1 | 7/2018 | Wu | |
| 10,017,525 B2 | 7/2018 | Margulies et al. | |
| 10,033,989 B2 | 7/2018 | Wu et al. | |
| 10,037,753 B2 | 7/2018 | Hui et al. | |
| 10,039,143 B2 * | 7/2018 | Fyfe | H04W 84/18 |
| 10,054,543 B2 | 8/2018 | Schnee | |
| 10,075,623 B2 | 9/2018 | Roozeboom et al. | |
| 10,082,438 B2 | 9/2018 | Zhang | |
| 10,088,157 B2 | 10/2018 | Sutton | |
| 10,092,268 B2 | 10/2018 | Krimsky et al. | |
| 10,094,797 B2 | 10/2018 | Le Neel et al. | |
| 10,109,080 B2 | 10/2018 | Brady et al. | |
| 10,123,722 B2 | 11/2018 | Banet et al. | |
| 10,126,155 B1 | 11/2018 | AlSahan | |
| 10,182,728 B2 | 1/2019 | Gu et al. | |
| 10,185,563 B2 | 1/2019 | Peixoto Machado Da Silva et al. | |
| 10,193,377 B2 | 1/2019 | Ping | |
| 10,203,493 B2 | 2/2019 | Kirma et al. | |
| 10,222,500 B2 | 3/2019 | Leboeuf | |
| 10,241,097 B2 | 3/2019 | Miresmailli et al. | |
| 10,241,191 B2 | 3/2019 | Palzek et al. | |
| 11,022,511 B2 | 6/2021 | Kain | |
| 2007/0119266 A1 | 5/2007 | Kain | |
| 2009/0033513 A1 | 2/2009 | Salsbury et al. | |
| 2009/0285154 A1 * | 11/2009 | Gesmundo | H04B 7/18584 |
| | | | 370/316 |
| 2010/0145479 A1 | 6/2010 | Griffiths | |
| 2011/0035491 A1 | 2/2011 | Gelvin et al. | |
| 2011/0196651 A1 * | 8/2011 | Delin | H04W 56/001 |
| | | | 702/178 |
| 2011/0261738 A1 * | 10/2011 | Mukherjee | H04W 40/28 |
| | | | 370/328 |
| 2011/0285516 A1 * | 11/2011 | Ritter | H04W 88/04 |
| | | | 370/276 |
| 2012/0081106 A1 | 4/2012 | Grinberg et al. | |
| 2012/0271548 A1 | 10/2012 | Koehler et al. | |
| 2017/0162040 A1 * | 6/2017 | Hammerschmidt | G08C 15/00 |
| 2017/0242686 A1 * | 8/2017 | Vidyadhara | G06F 8/656 |
| 2017/0370694 A1 | 12/2017 | Yoshida et al. | |
| 2018/0113005 A1 | 4/2018 | Selvaraj | |
| 2020/0409687 A1 * | 12/2020 | Rouland | G06F 21/572 |
| 2021/0073692 A1 * | 3/2021 | Saha | G08B 21/16 |
| 2023/0056132 A1 * | 2/2023 | Cavanaugh | E01C 23/01 |
| 2023/0367584 A1 * | 11/2023 | Tai | H04L 67/12 |

OTHER PUBLICATIONS

International Search Report and Written Opinion dated Oct. 29, 2019, from the corresponding International Application No. PCT/US2019/015572.

* cited by examiner

SENSOR NERVOUS SYSTEM

CROSS-REFERENCE TO RELATED APPLICATIONS

This application claims priority to U.S. Provisional Application Ser. No. 63/292,461, filed Dec. 22, 2021, the entire contents of which are hereby incorporated by references in their entirety.

FIELD OF THE INVENTION

This invention relates to sensors and sensor systems whereby the sensor system into which the sensors are placed can grow or shrink according to the system's needs. The sensor system is self-configuring so that as sensors are placed or de-placed in the system, no user interference is required. System information is internally flowed down into the individual sensors that make up the system so that sensors can be swapped in and out, sensors are plug and play, and require no user intervention for the system to fully operate.

BACKGROUND

Commercial, industrial, and military industries at large have trended towards more sensorization of platforms over the past couple of years, as platforms have become more complex, need more sustainment, have become more expensive, and can provide more useful data with more sensor inputs. Platforms can range from food and beverage packaging lines to weapons systems on ships to medical monitoring devices, and everything in between. In response to this trend in sensorization, a plethora of diverse sensor manufacturers, vendors, and suppliers have grown up, each with their own unique sensor characteristics flavored by the individual corporation's identity. The more sensing desired, the more diverse vendors are needed, the more individualization of sensor functionality and communications is presented, so that an ideal sensory nervous system capable of organic growth, keeping up with mission and sustainment needs creep, adding and/or subtracting different and multi-discipline sensor and sensing capability, becomes complex, prohibitively expensive, and sometimes practically impossible as the "nervous system" needs to accommodate sensors from various suppliers, none of which are consciously designed to integrate together for the particular platform in need. It is primarily the responsibility of the end user of the platform to be able to incorporate sensors from vendor A, B and C to do what is needed by either doing it themselves or hiring a system integrator.

To be sure, sensor networks exist in the arts that allow multiple sensor types to be integrated into a uniform system however, the integration is done as an afterthought to sensor determination and is not contemplated as a sensor nervous system ecosystem. Meaning, once the sensor type and quantity are determined, then the platform is either designed or adapted or provisioned for allowing all the varied sensors to communicate over a single system. For example, one may have a desired system of force sensors from vendor X that provides an analog output of 0-5V, a pressure sensor from company Y that provides a 4-20 mA analog output, and a proximity sensor that provides a PWM output. It is then up to the system integrator to provide a commonality platform that allows all these diverse outputs to be collected, analyzed, and communicated over, for example, a Bluetooth or IoT network. This integration in general requires, bespoke electronics designs, extensive testing, complex software, and costly expenses. However, many have tried to reduce this complexity and cost by using various means. U.S. Pat. Nos. 9,758,368 and 9,890,038 to Gogoi combines multiple sensor types onto a single MEMS substrate reducing sensor footprint, but each sensor type remains its own individual sensor thereby requiring the need for integration of its unique electronic requirements with any other sensor type on the unified MEMS substrate. U.S. Pat. No. 10,123,722 to Banet et al. discloses a multi-sensor system for crop monitoring but essentially combines various discrete sensors into a common housing, rather than combining the various sensors into a common sensor platform. Similarly, U.S. Pat. No. 10,088,157 to Sutton et al discloses a multi-sensor probe for combustion monitoring which combines a discrete oxygen and a discrete temperature sensor onto a single probe that is used at a plurality of locations, but each sensor stands alone and provides a signal that needs to be integrated individually into the overall system. U.S. Pat. No. 9,063,016 to Bohan et al discloses a failsafe multi-sensor component comprising different sensor types but none are integrated into a common sensor topology, rather they are individual sensors with their own characteristics that are integrated into an overall system.

SUMMARY

In accordance with the principles of the present invention the Sensor Nervous System (SNS) represents an ecosystem where sensors can be deployed such that any sensor from any vendor can be integrated into or removed from the ecosystem without the need for redesigning the sensor, sensor system, or ecosystem to accommodate the changes in sensor device count, type, or functionality. The SNS is agnostic to which platform it is deployed upon and can be used for retrofitting and enhancing existing platforms or integrated into new platform designs. Individual sensors are integrated into sensor pods and the sensor pods are, in turn, integrated into the SNS ecosystem.

It is an advantage of the present invention that the SNS is agnostic to sensor type and sensor vendor. The SNS accepts as inputs the most common sensor device outputs including, but not limited to, voltage, current, frequency, phase, digital, analog, optical, IR, RF, microwave, etc. and combinations thereof.

It is yet another advantage of the present invention that the sensor pods can contain multiple sensor types and multiple sensor quantities depending on application, need, configuration, footprint, and functionality. The sensors may be internal or external to the sensor pod itself. If external to the pod, the sensors may be connected to the sensor pod either wirelessly, wired, optically, IR, or any other means of accepted communications and power link.

It is yet another advantage of the present invention that the sensor pods contain non-volatile memory for storing captured sensor data so that when communications with the SNS is denied or reduced, the sensor data is not lost and can be re-communicated once communications functionality is restored.

It is yet another advantage of the present invention that the sensor pods have the ability to process and evaluate information so that Artificial Intelligence/Machine Learning (AI/ML) models and analysis can be incorporated. This is called computing/modelling "at the edge".

It is yet another advantage of the present invention that the SNS has the capability of providing multiple channels of functionality operating with different parameters concurrently. For example, a dedicated channel just for communicating alarm/threshold conditions running at a much faster speed than a channel that simply collects each sensor pods data.

It is yet another advantage of the present invention that the SNS is self-configuring and self-organizing in that among multiple SNS subsystems that make up the entire SNS ecosystem, the subsystems choose, by agreed upon constraints, parameters, and conditions, which subsystem controller becomes the master controller of the overall SNS ecosystem. Each subsystem controller has the built-in potential to become a master controller such that if the present master controller is disabled or non-functional, a new ecosystem master controller can be autonomously chosen.

It is yet another advantage of the present invention that the sensor pods and controllers talk to each other in a bi-directional fashion so that autonomously, without the need for user interface, performance parameters, characteristics, functionality, and updates can be modified and sent for reprogramming to the sensor pod and controllers. For example, initially a subsystem might be required to monitor the pressure of a certain machine, but as the mission evolves, the machine now has to have the force on the bearings measured at a new and different threshold parameter—the overall ecosystem can re-purpose and re-program the necessary sensor pods to complete this new mission. This is extremely advantageous when AI/ML modelling "at the edge" is incorporated so that the models dictate how the ecosystem evolves in its sensor data gathering capabilities and functionality. This allows for a closed loop behavioral ecosystem whereby sensors make measurements, AI/ML analyzes the data and prognosticates, the SNS then flows down to the sensor pods the new measurement parameters thereby having the SNS ecosystem continuously optimized for its platform's mission.

DETAILED DESCRIPTION

Figure 1:
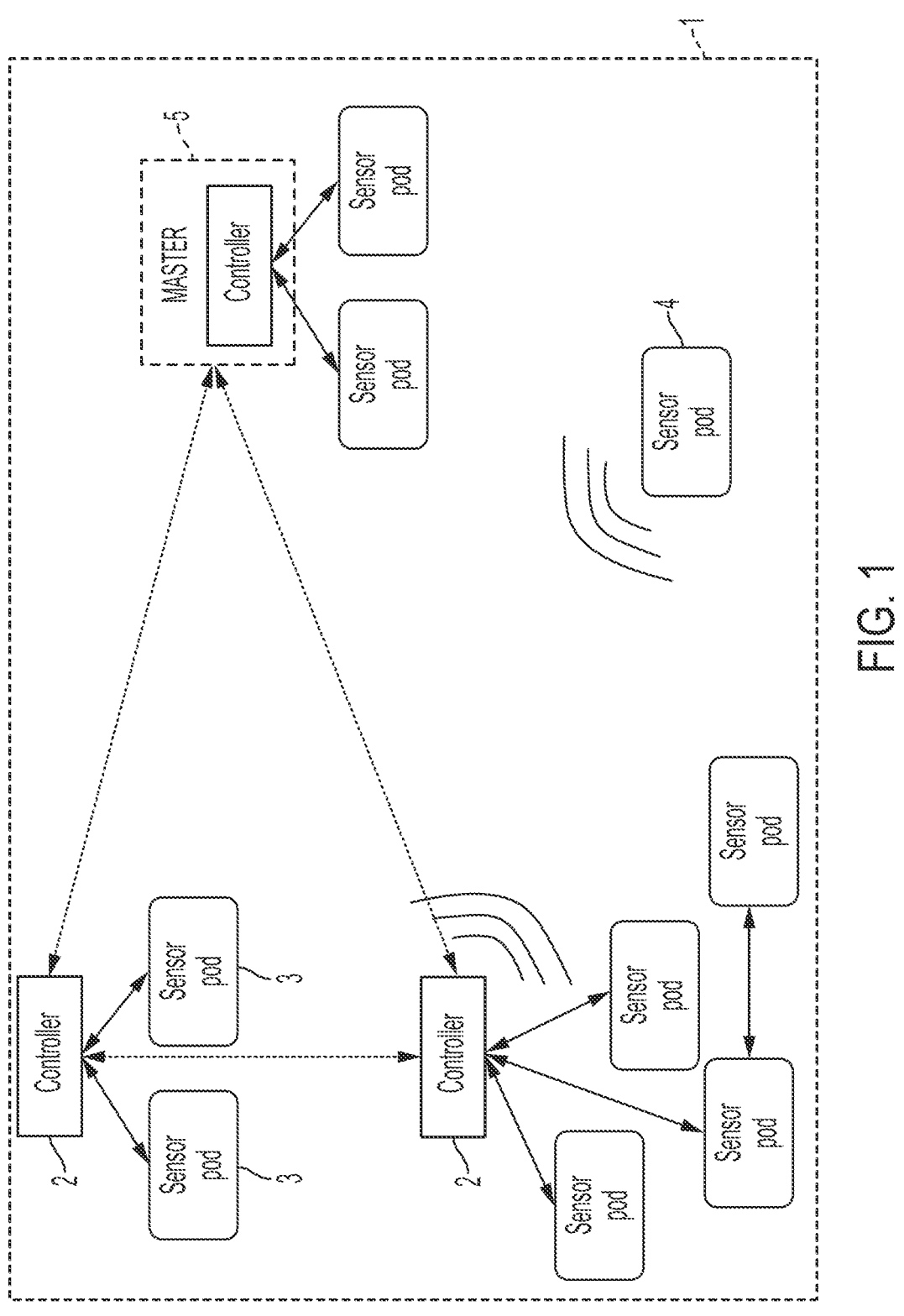
FIG. 1 is a block diagram of the SNS ecosystem.

The SNS ecosystem 1 (FIG. 1) is comprised of multiple components consisting of one or more controllers 2 and one or more of sensor pods 3. A controller 2 may be used to command, control, and organize a number of sensor pods 3 into various subsystems that perform specific monitoring tasks. Alternatively, individual sensor pods 4 can be integrated into the SNS ecosystem 1 without the need for a controller to act as coordinator. However, it is preferred, but not required, that there exists at least one controller that serves as the master controller 5 that coordinates the entire SNS ecosystem. Any number of sensor pods and controllers can be used to make up the ecosystem with no restriction on component quantities. The quantity, positioning, and functioning of the components will depend on the nature of the application for which the SNS is used. The SNS ecosystem 1 is agnostic to its deployment in any particular application. For example, one may deploy the SNS ecosystem 1 to monitor, prognosticate, and perform condition-based machinery diagnostics on a weapons platform just as easily as on a food and beverage filling production line platform. To be sure, different sensor types, functionality, monitored parameters, and necessary characteristics will be needed for each particular platform application, but the SNS ecosystem's 1 overall usage, operation, functionality, and utility remains the same. As the SNS ecosystem 1 is modular in its construction and its deployment, the ecosystem can expand and contract based on need. Meaning, controllers 2 and sensor pods 3 can be added to or subtracted from the SNS ecosystem 1 at will, without the need for an ecosystem re-design. The SNS ecosystem 1 mimics the function of a living nervous system in that it is a dynamic system capable of reconfiguration on the fly, while maintaining the context of functionality and desired parameters, rather than a static deployed system of sensors where adding sensors or removing sensors from the overall system results in either re-designing a new sensor system or modifying the existing sensor system that results in both unintended consequences as well as an increase in cost and complexity.

Figure 2:
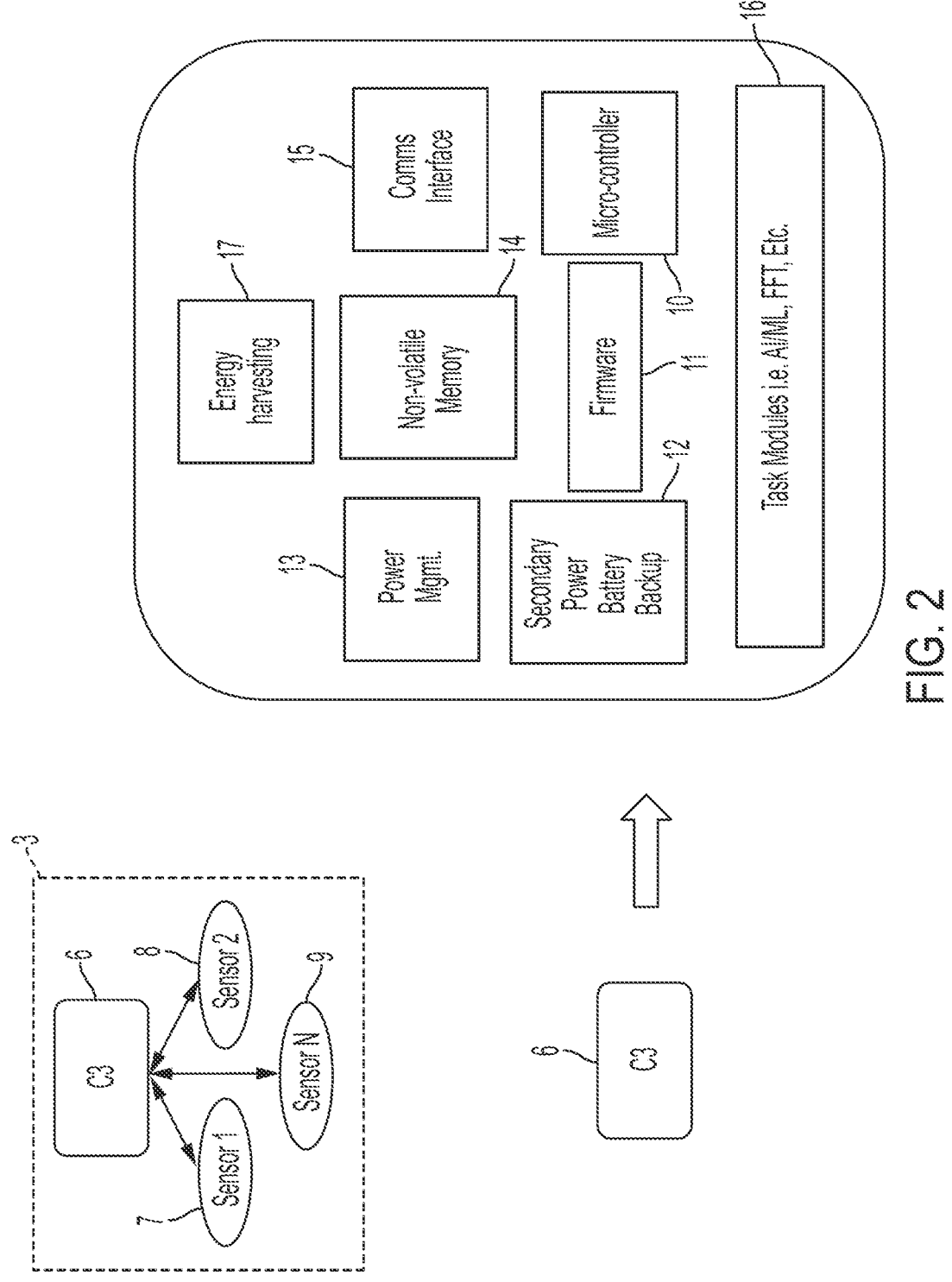
FIG. 2 is a block diagram of the sensor pod of the invention as taught herein.

The fundamental building block of the SNS ecosystem 1, is the sensor pod 3 shown in FIG. 2. The sensor pod 3 consists of the command, control, and communications portion (C3) 6, and the individual sensors 7, that sense the required information and data that is being measured. The sensor pod 3 may comprise multiple sensors 7 of either the same or different types of sensing functionality such as pressure 8, force, torque, electromagnetic field measurement 9, etc. or combination thereof, depending on the logical conglomeration of the sensing needs at the location of the sensor pod 3 within the SNS ecosystem 1. The sensors 7 may be collocated in the same physical housing structure that comprises the sensor pod 3, or may be external to the sensor pod 3. The sensors 7 connect to the C3 6 via some established communications method such as wired, wireless, Ethernet, RF, IR, etc. as is well known in the arts. The C3 6, in its preferred embodiment, is designed to accommodate the most common forms of sensor output such as, but not limited to, voltage, current, digital data, frequency, etc. so that any vendors best-in-breed sensor 7 can be integrated into the sensor pod 3 without the need for unique electronics design. However, it is understood by those skilled in the art, that bespoke sensor/C3 interface capability is surely available based on the ecosystem's needs.

Drilling down further into the SNS ecosystem 1, the sensor pod 3, contains the common core C3 module 6. This module 6 is common to all sensor pods and provides the "glue" to which all sensor pods are integrated into the SNS ecosystem 1. The C3 module 6 is a smart controller and interface and consists of a microcontroller 10 or any other physical structure that allows for logical or algorithmic decision making such as an FPGA or state machine, and/or firmware 11, that is necessary to inform the decision making if the controlling element requires programmatic coding. The C3 module 6 also has an on-board secondary backup power supply 12 such as a rechargeable battery, to allow the sensor pod 3 to continue functioning when primary power is unavailable. Additionally, power supplied to the sensor pod 3 can be garnered from optional on-board energy harvesting 17 from the ambient environment as the sensor pod 3 uses very little energy. The energy harvesting may be gathered from ambient vibrational, photovoltaic, RF, thermal energy or any other ambient energy capable of supplying power to either recharge the secondary power supply 12 or even supply primary power 13 to the sensor pod 3, depending on how plentiful the ambient energy is. The power management circuitry 13 provides the regulation and distribution of the power needed to operate the sensor pod 3. Furthermore, the sensor pod 3 has on-board non-volatile memory 14, such as NVRAM or solid state memory, to be able to store captured sensor or processed data. The non-volatile memory serves two purposes (1) retaining data should power/communications be interrupted and (2) provide synchronous data capture time stamping among all SNS sensor pods 3 for the capture of short-lived sensing measurement events. (1) needs little explanation and is well known for those skilled in the arts, however, (2) needs a bit more explanation. The amount of sensor data gathered is inversely proportional to the time duration of the event being captured. As an example, ambient temperature changes might need to be captured by a sensor 7 once every minute, while capturing the pressure wave of an explosion might require a sensor 7 to capture data every microsecond. Hence, short lived events will require vast amounts of captured data. This capturing of large quantities of data presents no problem with the sensor pod's 3 on-board non-volatile memory 14, whose amount can be tailored to the anticipated events capture needs. However, it will take time when retrieving the vast amount of data from each sensor 7 particularly if there are many sensors monitoring this short-lived event. As such, the non-volatile memory 14 not only captures the sensor data but also attaches a synchronized time stamp to each captured data point. Because of this, data can be retrieved from each sensor 7 at any desired rate and the short-lived event can be fully reconstructed across all sensors by simply matching each data point and time stamp across all sensors that have captured the event's data. This allows for optimized data transfer in the SNS without fear of losing desired data. Of course, sufficient non-volatile memory and periodic signals that synchronize the time stamp on each sensor pod 3 must be provided as is well known for those skilled in the art.

The communications interface 15 provides the necessary hardware and firmware needed for the sensor pod to be able to communicate with the rest of the SNS ecosystem 1. The communications protocols, and subsequent hardware, that is supported, but not limited too are, RS-232, RS-485, Wi-Fi (802.11x/x/x), RF, IR and optical. As those skilled in the art will appreciate, virtually any agreed upon standard or proprietary protocol can be supported in the sensor pod 3 provided the required hardware and firmware is in place.

An important overlay to the individual sensor pods 3 and the overall SNS ecosystem 1 is the ability to perform analysis and prognostication at the edge by incorporating individual software/firmware driven task modules 16. By directly incorporating analysis, diagnostic, and prognostic capability within the sensor pod 3 itself critical parameters and characteristics of the SNS ecosystem 1 can be determined without the need for transporting vast amounts of data to a backend host that will then crunch the data and return the required course of action to the SNS ecosystem 1. For example, assume a sensor pod 3 is measuring vibration with a wide bandwidth of perhaps 6 KHz. To get high fidelity of the vibration content one would typically sample the vibration at 32 KHz. This necessarily means that 32K samples per second are captured and transported over the communications network. If there are many vibration sensors 7, then this amount of data significantly increases. However, the predominant need for this data is so that a fast fourier transform (FFT) can be performed and frequency data can be extracted to determine the characteristics of the vibration that effect components and system functionality. Performing an FFT "at the edge", in the sensor pod 3 itself, drastically reduces the burden of data transport as the raw data is not transported (i.e. 32K samples/sec) just the results of the on-board processed FFT which is nothing more than the coefficients required to reconstruct the FFT. Similarly, performing AI/ML analysis in the sensor pod 3 itself allows for rapid decision making and prognostication for the overall ecosystem. Those skilled in the art will appreciate having the ability to not only transmit raw data but also analyze and actuate based on the data at edge as being a significant advantage to the overall system approach invention as taught herein.

Additionally, in order to extend the secondary power battery backup 12 lifetime before recharge, the invention as taught herein incorporates ambient energy harvesting 17. The energy harvesting can be from any number of ambient sources such as, but not limited to, photovoltaic, thermal, and vibrational energy sources from which useful power can be extracted to recharge the secondary power supply 12. The energy harvesting hardware 17 can be directly incorporated into the sensor pod 3 as an integral component. For example, solar cells can be integrated into the housing, while a cantilever beam made of PVDT for vibrational energy harvesting can be integrated into the sensor pod's PCB or even the walls or floor of the housing. The required electronics for the energy harvesting, such as, but not limited to, voltage multipliers, boost or buck converters and rechargeable battery watchdog electronics can all be integrated directly into the sensor pod's PCB's. It will be appreciated by those skilled in the art as to where best to incorporate the energy harvesting feature.

Figure 3:
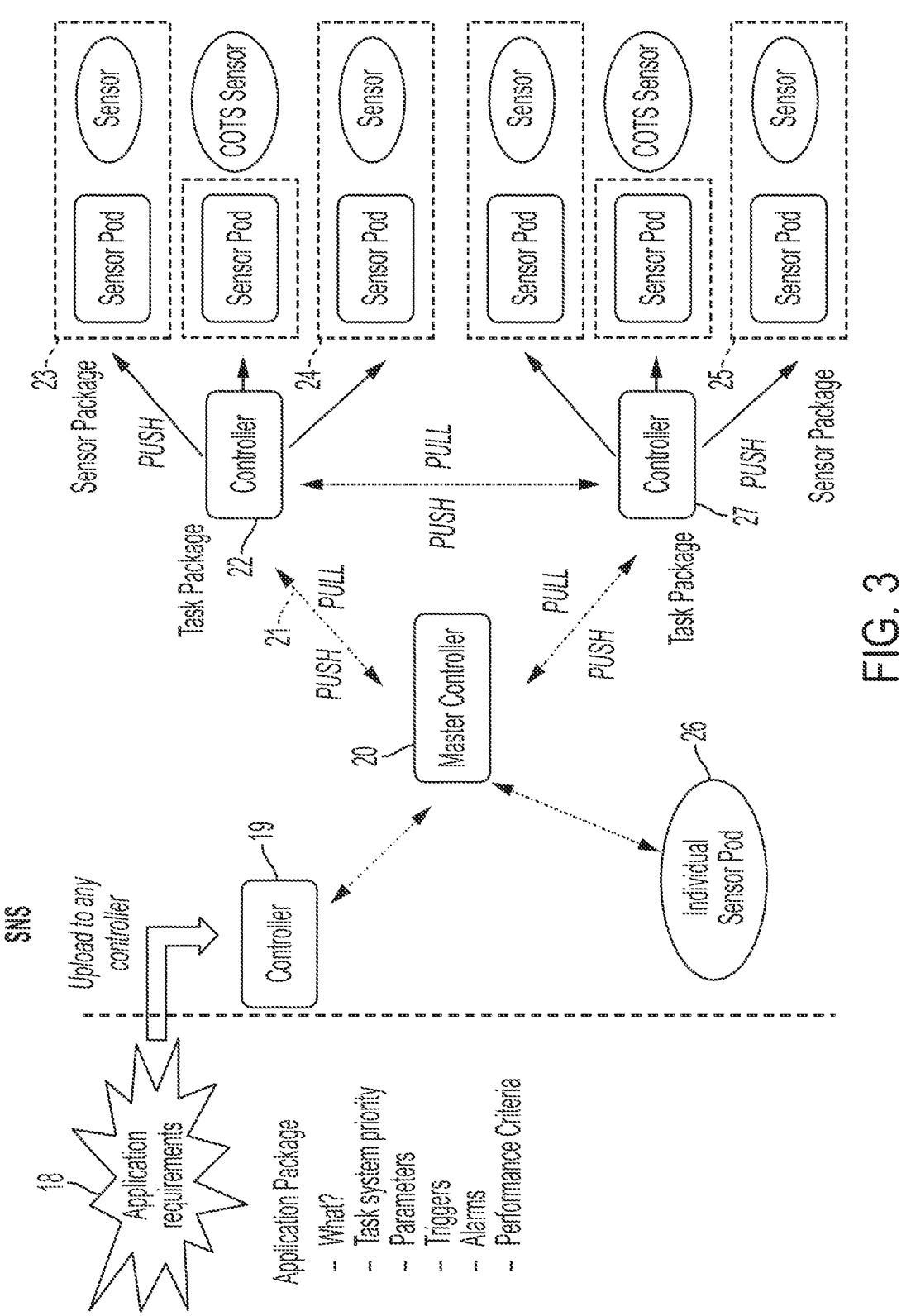
FIG. 3 is a block diagram of the firmware/software of the invention as taught herein

Taking the common core sensor pods 3 and their associated sensor(s) and integrating them into the SNS ecosystem 1 is the domain of the firmware 11 and software that commands and controls the invention as taught herein. Referring to FIG. 3, the application requirements 18 are defined by the user in order to determine the functional and performance requirements, characteristics, criteria, and parameters that the SNS ecosystem 1 must operate under. These requirements can be uploaded to any controller 19 or sensor pod 26 within the SNS ecosystem 1. The controller 19 or sensor pod 26 to which the requirements have been uploaded to, then propagates these requirements to the master controller 20. The master controller 20 task is a software overlay to a regular controller's 19 existing functionality so that any controller 19 can become a master controller 20. The master controller 20 is chosen autonomously from within the SNS ecosystem 1 from among all the controllers 19 and/or sensor pods 20 based on system parameters such as, but not limited to, signal strength to relay point, proximity to other components, temperature stability, and available computing power. The SNS ecosystem 1 continuously evaluates the master controller selection criteria so that the master controller 20 can be switched among any other controller 19 or sensor pod 26 as best is suited for the overall SNS ecosystem 1 to function optimally. A change of master controller might, for example, occur if the existing master controller 20 becomes damaged or non-functional in one or more functionality criteria. Once the application requirements 18 are uploaded to the current master controller 20, the master controller 20 flows down these requirements to the downstream controllers 22, 27 within the SNS ecosystem 1. Each downstream controller 22, 27 receives its particular requirements functionality. This flow down of requirements is accomplished by having the controllers 22, 27 tell the master controller 20 what sensor pods 24, 25 each controller is responsible for and the master controller 20 then parsing the application requirements for that particular controller/sensor pod configuration. This is the exchange of information ("push/pull") 21 referred to in FIG. 3. This exchange of information occurs between all controllers 22, 27 and the master controller 20. For example, if one of the subsystems, controlled by controller 22, is to measure force and pressure, the master controller 20 will flow down the appropriate criteria to that controller 22 indicating what parameters and functionality that controller's subsystem must perform. The controller 22 then flows down the particular functionality and parameters that the sensor pod(s) 24, 25 must perform to the individual sensor pods under its auspices. For example, controller 22 might tell sensor pod 23 which is a pressure sensor pod to measure up to 100 PSI at a sampling interval of 100 ms and report any pressure above a threshold of 75.6 PSI. The controller 22 knows that sensor pod 23 is a pressure measurement sensor pod as sensor pod 23 has a unique identifier that is communicated to controller 22 when the SNS ecosystem 1 is initiated. Controller 22 then sends a unique identifier back to sensor pod 23 indicating that controller 22 and sensor pod 23 are connected into the same subsystem. This way controller 22 autonomously knows which sensor pods are under its "command" and keeps track of their association. This two-way association identification is important for the following reason. Let us assume that sensor pods 24 and 25 are both force sensor pods but are in different controller subsystems 22 and 27. Let's further assume that sensor pod 24 gets damaged, reports this to controller 22, and that the subsystem that sensor pod 25 is located in, controller 27, is not a high priority need monitoring subsystem. The user can then take sensor pod 25, which is in good working order and comparable in hardware to sensor pod 24, and simply swap 24 for 25. Sensor pod 25 now communicates with controller 22 sending to controller 22 its measurement capabilities. However, controller 22 immediately recognizes that sensor pod 25 does not have a matching identifier to belong to its subsystem. Microcontroller then queries sensor pod 25 and determines that it is compatible and can do the job of damaged sensor pod 24. Controller 22 now sends the unique identifier to sensor pod 25 welcoming sensor pod 25 into controller 22's subsystem. This "hot swapping" of like sensor pod types is done autonomously within the SNS ecosystem 1 without the need for user intervention. In this way sensor pods and controllers can be replaced/swapped at will, depending on the application need, with the swapping, configuration, adjustments, and provisioning of the system and components being completely transparent to the user. It will be appreciated by those skilled in the art that many other nuances and software capabilities can be implemented. However, all these nuanced and software capabilities are premised on the herein taught invention's provisioning of full, two-way intelligent communications, identification, handshaking, and providing coherent and actionable information between the SNS ecosystem's components, that allow for these advantages and benefits to be realized.

The invention claimed is:

1. A sensor nervous system (SNS) comprising:
a master controller;
a plurality of controllers in communication with the master controller;
a plurality of sensor pods in communication with each controller,
wherein each sensor pod comprises at least one sensor,
wherein the master controller communicates a set of application requirements to each controller of the plurality of controllers,
wherein, if a first controller of the plurality of controllers is unable to execute the set of application requirements, the master controller selects a second controller that executes the set of application requirements sent to the first controller, wherein each sensor pod able to execute the set of application requirements autonomously records sensor data for a first time duration during a first event, the sensor data comprising a plurality of sensor data points and associated synchronized time stamps, and
wherein each sensor pod autonomously communicates the sensor data for the first event to at least one controller from the plurality of controllers over a second time duration greater than or equal to the first time duration; and
a third controller coupled to the master controller after the second controller is disconnected or damaged,
wherein the third controller automatically registers with the master controller, and
wherein the master controller communicates a new set of application requirements to the third controller.

2. The SNS according to claim 1, wherein the at least one sensor is hot swappable with another sensor.

3. The SNS according to claim 1, wherein each of the plurality of sensor pods comprises:
a control circuit comprising:
a communication interface for communicating with the controller.

4. The SNS according to claim 3, wherein each of the plurality of sensor pods comprises:
a control circuit comprising:
an energy harvesting circuit for harvesting ambient energy external to the sensor pod; and
a power management circuit for storing the harvested ambient energy.

5. The SNS according to claim 3, wherein the communication interface is a wireless communication interface.

6. The SNS according to claim 3, wherein each of the plurality of sensor pods further comprises:
a microcontroller or state logic machine for registering and detecting any sensors coupled to the sensor pod.

7. The SNS according to claim 1, wherein the plurality of controllers and the plurality of sensor pods are in bidirectional communication with the master controller and each other.

8. The SNS according to claim 1, wherein the set of application requirements include sensing instructions for the plurality of sensor pods.

9. The SNS according to claim 1, wherein each controller of the plurality of controllers comprises a copy of set of the application requirements or a subset of the set of application requirements.

10. The SNS according to claim 9, wherein a second controller from the plurality of controllers becomes the master controller if the master controller is disconnected from the SNS.

11. The SNS according to claim 1, further comprising:
an independent sensor pod in direct communication with the master controller,
wherein the independent sensor pod comprises at least one sensor.

12. The SNS according to claim 1, wherein diagnostic, prognostic, sensor measurement data analysis, and health monitoring capability of the SNS and application to which it is applied is incorporated into functionality of the SNS.

13. The SNS according to claim 1, wherein software and hardware algorithmic agents comprising built in tests, artificial intelligence, machine learning, condition and health based monitoring, and sensor data processing are incorporated into the plurality of sensor pods and plurality of controllers in order to inform decision making processes of the SNS.

14. The SNS according to claim 1, wherein each sensor pod autonomously communicates the sensor data directly to the master controller or a controller of the plurality of controllers.

15. The SNS according to claim 1, wherein the at least one sensor measures an environmental condition external to the body of the sensor pod.

16. The SNS according to claim 1, wherein the at least one sensor pod does not coordinate the communication of the sensor data to the at least one controller.

17. The SNS according to claim 1, wherein the at least one sensor pod communications the sensor data without intervention from the at least one controller.

18. The SNS according to claim 1, wherein each sensor pod can function as a controller of the plurality of controllers, and wherein the at least one sensor is internal to a body of the sensor pod.

* * * * *